United States Patent
Sole Rojals et al.

(10) Patent No.: US 10,368,099 B2
(45) Date of Patent: Jul. 30, 2019

(54) COLOR REMAPPING INFORMATION SEI MESSAGE SIGNALING FOR DISPLAY ADAPTATION

(71) Applicant: QUALCOMM Incorporated, San Diego, CA (US)

(72) Inventors: Joel Sole Rojals, Reus (ES); Done Bugdayci Sansli, Tampere (FI); Adarsh Krishnan Ramasubramonian, San Diego, CA (US); Dmytro Rusanovskyy, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/670,832

(22) Filed: Aug. 7, 2017

(65) Prior Publication Data

US 2018/0048913 A1  Feb. 15, 2018

Related U.S. Application Data

(60) Provisional application No. 62/372,692, filed on Aug. 9, 2016.

(51) Int. Cl.
*H04N 19/30* (2014.01)
*H04N 19/597* (2014.01)
(Continued)

(52) U.S. Cl.
CPC ......... *H04N 19/597* (2014.11); *H04N 19/186* (2014.11); *H04N 19/30* (2014.11);
(Continued)

(58) Field of Classification Search
CPC combination set(s) only.
See application file for complete search history.

(56) References Cited

U.S. PATENT DOCUMENTS

| | | | | |
|---|---|---|---|---|
| 9,190,014 | B2 * | 11/2015 | Messmer | H04N 1/6058 |
| 2015/0103919 | A1 * | 4/2015 | Hattori | H04N 19/124 375/240.25 |

(Continued)

FOREIGN PATENT DOCUMENTS

EP  3010231 A1  4/2016

OTHER PUBLICATIONS

Response to Written Opinion from corresponding PCT Application Serial No. PCT/US2017/045947 filed on May 30, 2018, (22 pp).

(Continued)

*Primary Examiner* — Behrooz M Senfi
(74) *Attorney, Agent, or Firm* — Shumaker & Sieffert, P.A.

(57) ABSTRACT

In one example, a method includes determining, by a video decoding unit, a peak brightness value of a current display; obtaining, by the video decoding unit and for a picture of video data, one or more color remapping messages that each correspond to a respective peak brightness value of a set of peak brightness values; selecting, by the video decoding unit and based on the peak brightness value of the current display, a color remapping message of the one or more color remapping messages; color remapping, by the video decoding unit and based on the selected color remapping message, samples of the picture of video data; and outputting, by the video decoding unit and for display at the current display, the color remapped samples of the picture of video data.

25 Claims, 8 Drawing Sheets

(51) Int. Cl.
*H04N 19/52* (2014.01)
*H04N 19/70* (2014.01)
*H04N 19/46* (2014.01)
*H04N 19/186* (2014.01)
*H04N 19/85* (2014.01)

(52) U.S. Cl.
CPC ............ *H04N 19/46* (2014.11); *H04N 19/52* (2014.11); *H04N 19/70* (2014.11); *H04N 19/85* (2014.11)

(56) References Cited

U.S. PATENT DOCUMENTS

2018/0007363 A1* 1/2018 Oh ........................ H04N 19/10
2018/0048913 A1* 2/2018 Sole Rojals ........... H04N 19/30

OTHER PUBLICATIONS

Second Written Opinion from corresponding PCT Application Serial No. PCT/US2017/045947 dated Jun. 20, 2018, (7 pp).
Hattori S., et al., "HLS: SEI Message for Knee Function Information", 16, JCT-VC Meeting, Jan. 9, 2014-Jan. 17, 2014; San Jose; (Joint Collaborative Team on Video Coding of ISO/IEC JTC1/SC29/WG11 and ITU-T SG.16 ); URL: http://wftp3.itu.int/av-arch/jctvc-site/,, No. JCTVC-P0050-v2, Jan. 15, 2015, XP030115514, 21 pages.
International Search Report and Written Opinion—PCT/US2017/045947—ISA/EPO—dated Oct. 17, 2017.
Joshi R., et al.,"HEVC Screen Content Coding Draft Text 6", JCT-VC Meeting, Feb. 2016, URL: http://wftp3.itu.int/av-arch/jctvc-site/no.JCTVC-W1005_v1, Mar. 24, 2016, XP030117928, 83 pages.
ITU-T H.265, "Series H: Audiovisual and Multimedia Systems, Infrastructure of audiovisual services—Coding of moving video, High efficiency video coding," The International Telecommunication Union. Dec. 2016, 664 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-R Recommendation BT.709, "Parameter Values for the HDTV Standards for Production and International Programme Exchange," Apr. 2002, 32 pp.
ITU-R Recommendation BT.2020-2, "Parameter values for ultra-high definition television systems for production and International programme exchange," Oct. 2015, 8 pp.
Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pp.
"High Dynamic Range Electra-Optical Transfer Function of Mastering Reference Displays" SMPTE Standard, SMPTE-2084:2014; 14 pp.
ITU-R Recommendation ITU-R BT.2100-0, Image parameter values for high dynamic range television for use in production and international programme exchange International Telecommunication Union, Jul. 2016, 17 pp.
"ATSC Standard: Video—HEVC," ATSC A/341:2017, May 19, 2017, 30 pp.
"Digital Video Broadcasting (DVB); Plano-stereoscopic 3DTV; Part 2: Frame Compatible Plano-stereoscopic 3DTV," ETSI TS 101 547-2, V1.2.1, Nov. 2012, 26 pp.
3GPP TS 26.114, V13.1.0, Technical Specification, "3rd Generation Partnership Project; Technical Specification Group Services and System Aspects; IP Multimedia Subsystem (IMS); Multimedia Telephony; Media handling and interaction (Release 13)," Sep. 2015, 327 pp.
ETSI, ETS TS 101 154, V1.9.1, Technical Specification, "Digital Video Broadcasting(DVB); Specification for use of Video and Audio Coding in Broadcasting Applications based on MPEG-2 Transport Stream," Sep. 2009, 163 pp.
International Preliminary Report on Patentability—PCT/US2017/045947, The International Bureau of WIPO—Geneva, Switzerland, dated Oct. 24, 2018 (24 pp).

* cited by examiner

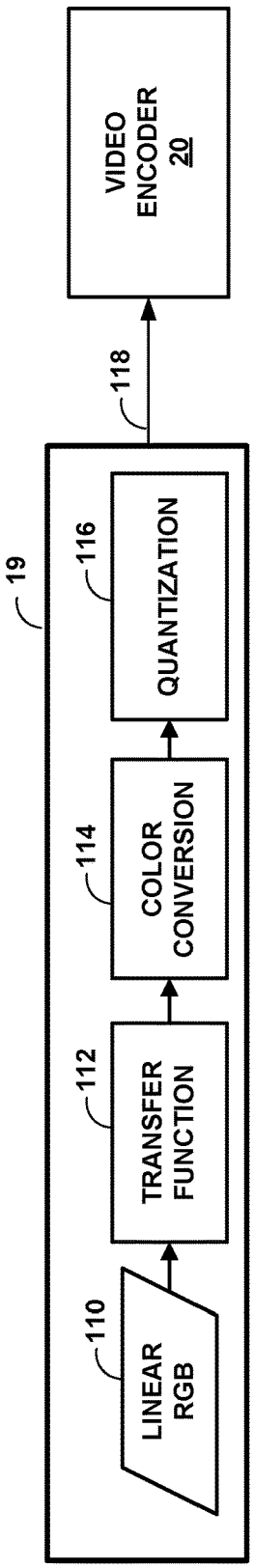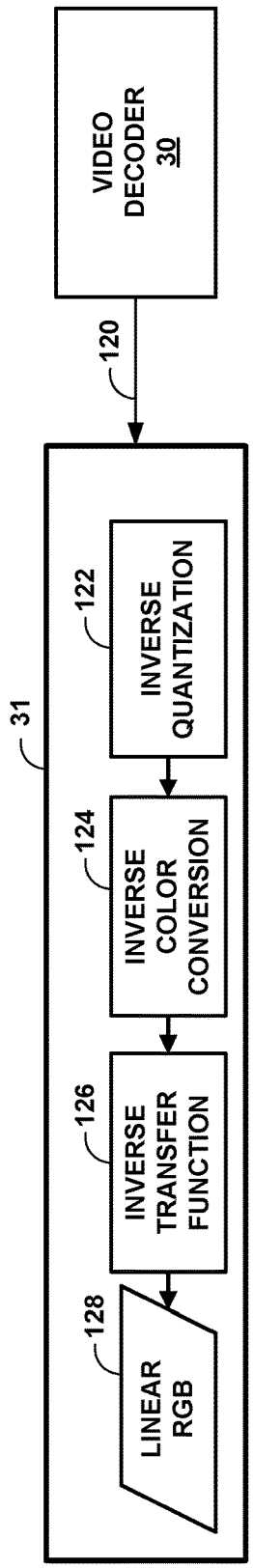

COLOR REMAPPING INFORMATION SEI MESSAGE SIGNALING FOR DISPLAY ADAPTATION

This application claims the benefit of U.S. Provisional Application No. 62/372,692, filed Aug. 9, 2016, the entire content of which is hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In one example, a method of processing decoded video data includes determining, by a video decoding unit, a peak brightness value of a current display; obtaining, by the video decoding unit and for a picture of video data, one or more colour remapping messages that each correspond to a respective peak brightness value of a set of peak brightness values; selecting, by the video decoding unit and based on the peak brightness value of the current display, a colour remapping message of the one or more colour remapping messages; colour remapping, by the video decoding unit and based on the selected colour remapping message, samples of the picture of video data; and outputting, by the video decoding unit and for display at the current display, the colour remapped samples of the picture of video data.

In another example, a method of encoding video data includes encoding, by a video encoder and in a bitstream, sample values for a picture of video data; encoding, by the video encoder and in the bitstream, one or more colour remapping messages for the picture of video data, each of the colour remapping messages corresponding to a respective peak brightness value of a set of peak brightness values; and outputting, by the video encoder, the bitstream.

In another example, a device for processing decoded video data includes a memory configured to store the video data; and a video decoding unit. In this example, the video decoding unit is configured to determine a peak brightness value of a current display; obtain, for a picture of the video data, one or more colour remapping messages that each correspond to a respective peak brightness value of a set of peak brightness values; select, based on the peak brightness value of the current display, a colour remapping message of the one or more colour remapping messages; colour remap, based on the selected colour remapping message, samples of the picture of video data; and output, for display at the current display, the colour remapped samples of the picture of video data.

In another example, a device for encoding video data includes a memory configured to store video data; and a video encoding unit. In this example, the video decoding unit is configured to encode, in a bitstream, sample values for a picture of video data; encode, in the bitstream, one or more colour remapping messages for the picture of video data, each of the colour remapping messages corresponding to a respective peak brightness value of a set of peak brightness values; and output the bitstream.

In another example, a device for processing decoded video data includes means for determining a peak brightness value of a current display; means for obtaining, for a picture of video data, one or more colour remapping messages that each correspond to a respective peak brightness value of a set of peak brightness values; means for selecting, based on the peak brightness value of the current display, a colour remapping message of the one or more colour remapping messages; means for colour remapping, based on the selected colour remapping message, samples of the picture of video data; and means for outputting, for display at the current display, the colour remapped samples of the picture of video data.

In another example, a device for encoding video data includes means for encoding, in a bitstream, sample values for a picture of video data; means for encoding, in the bitstream, one or more colour remapping messages for the picture of video data, each of the colour remapping messages corresponding to a respective peak brightness value of a set of peak brightness values; and means for outputting the bitstream.

In another example, a computer-readable storage medium stores instructions that, when executed, cause one or more processors of a video processing device to: determine a peak brightness value of a current display; obtain, for a picture of video data, one or more colour remapping messages that each correspond to a respective peak brightness value of a set of peak brightness values; select, based on the peak brightness value of the current display, a colour remapping message of the one or more colour remapping messages; colour remap, based on the selected colour remapping message, samples of the picture of video data; and output, for display at the current display, the colour remapped samples of the picture of video data.

In another example, a computer-readable storage medium stores instructions that, when executed, cause one or more processors of a video encoding device to: encode, in a bitstream, sample values for a picture of video data; encode, in the bitstream, one or more colour remapping messages for the picture of video data, each of the colour remapping messages corresponding to a respective peak brightness value of a set of peak brightness values; and output the bitstream.

The details of one or more examples are set forth in the accompanying drawings and the description below. Other features, objects, and advantages will be apparent from the description and drawings, and from the claims.

BRIEF DESCRIPTION OF DRAWINGS

FIG. 4 is a conceptual diagram showing a HDR/WCG representation conversion.

FIG. 5 is a conceptual diagram showing an HDR/WCG inverse conversion.

DETAILED DESCRIPTION

This disclosure is related to the field of coding of video signals with High Dynamic Range (HDR) and Wide Color Gamut (WCG) representations. More specifically, the techniques of this disclosure include several methods to improve the application the colour remapping information (CRI) SEI message specified in H.265/HEVC video coding standard. The disclosure includes means to enables the signalling of CRI SEI for display adaptation to target displays of different capabilities.

Video coding standards, including hybrid-based video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. The design of a new video coding standard, namely HEVC, has been finalized by the Joint Collaboration Team on Video Coding (JCT-VC) of ITU-T Video Coding Experts Group (VCEG) and ISO/IEC Motion Picture Experts Group (MPEG). An HEVC draft specification referred to as HEVC Working Draft 10 (WD10), Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan. 2013, JCTVC-L1003v34, is available from http://phenix.int-evry.fr/jct/doc_end_user/documents/12_Geneva/wg11/JCTVC-L1003-v34.zip. The finalized HEVC standard is referred to as HEVC version 1.

A defect report, Wang et al., "High efficiency video coding (HEVC) Defect Report," Joint Collaborative Team on Video Coding (JCT-VC) of ITU-T SG16 WP3 and ISO/IEC JTC1/SC29/WG11, 14th Meeting: Vienna, AT, 25 Jul.-2 Aug. 2013, JCTVC-N1003v1, is available from http://phenix.int-evry.fr/jct/doc_end_user/documents/14_Vienna/wg11/JCTVC-N1003-v1.zip. The finalized HEVC standard document is published as ITU-T H.265, Series H: Audiovisual and Multimedia Systems, Infrastructure of audiovisual services—Coding of moving video, High efficiency video coding, Telecommunication Standardization Sector of International Telecommunication Union (ITU), April 2013, and another version was published in October 2014.

Figure 1:
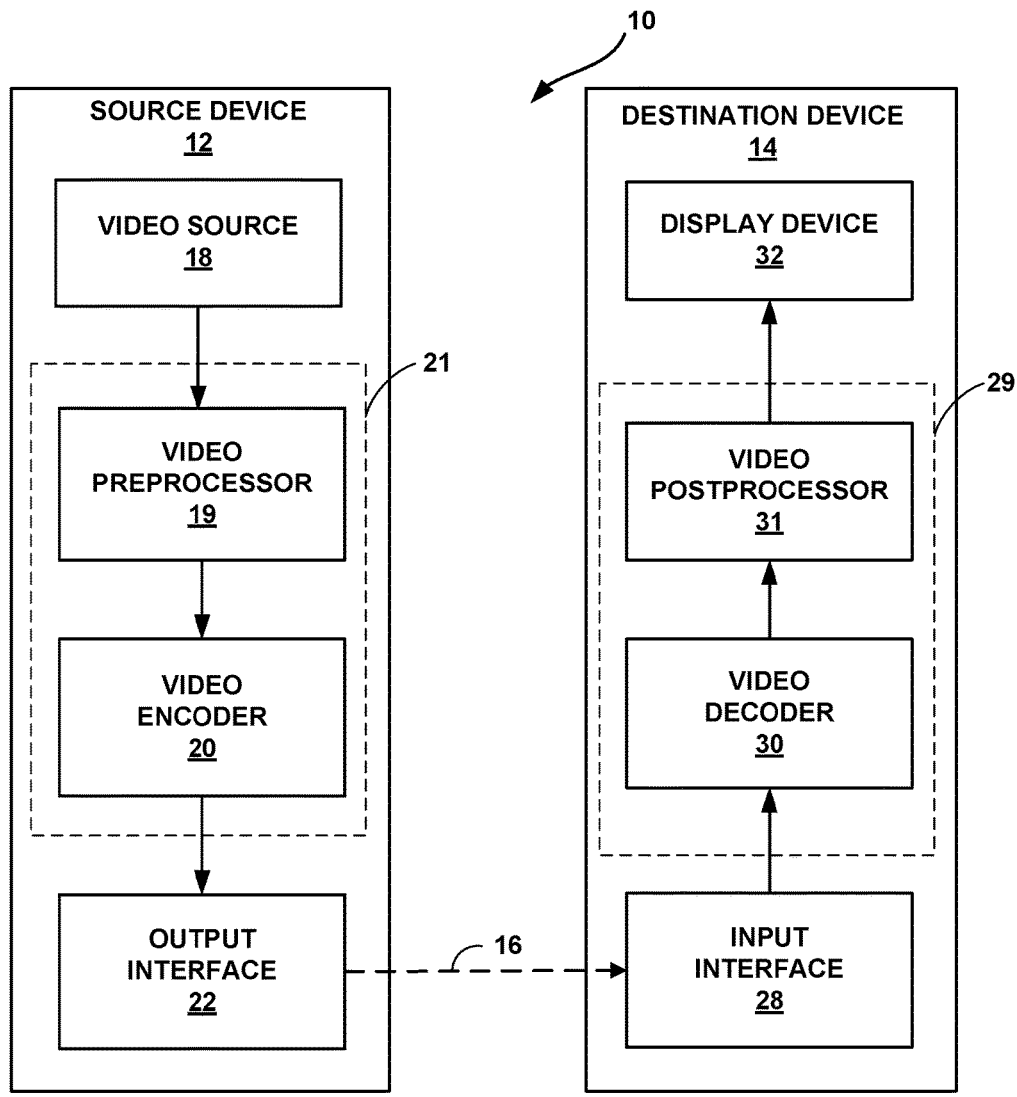
FIG. 1 is a block diagram illustrating an example video encoding and decoding system configured to implement the techniques of the disclosure.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by an input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoding unit 21, which includes video preprocessor 19 and video encoder 20, and output interface 22. Destination device 14 includes input interface 28, video decoding unit 29, which includes video decoder 30 and video postprocessor 31, and display device 32. In accordance with this disclosure, video preprocessor 19 and video postprocessor 31 may be configured to apply the example techniques described in this disclosure. For example, video preprocessor 19 and video postprocessor 31 may include a static transfer function unit configured to apply a static transfer function, but with pre- and post-processing units that can adapt signal characteristics.

In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." For ease of description, the disclosure is described with respect to video preprocessor 19 and video postprocessor 31 preforming the example techniques described in this disclosure in respective ones of source device 12 and destination device 14. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoding unit 21. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20 of video encoding unit 21, which is also used by video decoder 30 of video decoding unit 29, that includes syntax elements that describe characteristics and/or processing of blocks and other coded units, e.g., groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

As illustrated, video preprocessor 19 receives the video data from video source 18. Video preprocessor 19 may be configured to process the video data to convert it into a form that is suitable for encoding with video encoder 20. For example, video preprocessor 19 may perform dynamic range compacting (e.g., using a non-linear transfer function), color conversion to a more compact or robust color space, and/or floating-to-integer representation conversion. Video encoder 20 may perform video encoding on the video data outputted by video preprocessor 19. Video decoder 30 may perform the inverse of video encoder 20 to decode video data, and video postprocessor 31 may perform the inverse of video preprocessor 19 to convert the video data into a form suitable for display. For instance, video postprocessor 31 may perform integer-to-floating conversion, color conversion from the compact or robust color space, and/or inverse of the dynamic range compacting to generate video data suitable for display.

Video encoding unit 21 and video decoding unit 29 each may be implemented as any of a variety of fixed function and programmable circuitry such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoding unit 21 and video decoding unit 29 may be included in one or more encoders or decoders, either of which may be integrated as part of a combined encoder/decoder (CODEC) in a respective device.

Although video preprocessor 19 and video encoder 20 are illustrated as being separate units within video encoding unit 21 and video postprocessor 31 and video decoder 30 are illustrated as being separate units within video decoding unit 29, the techniques described in this disclosure are not so limited. Video preprocessor 19 and video encoder 20 may be formed as a common device (e.g., same integrated circuit or housed within the same chip or chip package). Similarly, video postprocessor 31 and video decoder 30 may be formed as a common device (e.g., same integrated circuit or housed within the same chip or chip package).

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multi-view Video Coding (MVC) extension, and MVC-based three-dimensional video (3DV) extension. In some instances, any bitstream conforming to MVC-based 3DV always contains a sub-bitstream that is compliant to a MVC profile, e.g., stereo high profile. Furthermore, there is an ongoing effort to generate a 3DV coding extension to H.264/AVC, namely AVC-based 3DV. Other examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual. In other examples, video encoder 20 and video decoder 30 may be configured to operate according to the ITU-T H.265, HEVC standard In HEVC and other video coding standards, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

Video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In a monochrome picture or a picture that has three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan.

This disclosure may use the term "video unit" or "video block" to refer to one or more blocks of samples and syntax structures used to code samples of the one or more blocks of samples. Example types of video units may include CTUs, CUs, PUs, transform units (TUs) in HEVC, or macroblocks, macroblock partitions, and so on in other video coding standards.

Video encoder 20 may partition a coding block of a CU into one or more prediction blocks. A prediction block may be a rectangular (i.e., square or non-square) block of samples on which the same prediction is applied. A prediction unit (PU) of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and, Cr residual blocks of a CU into one or more luma, Cb, and Cr transform blocks. A transform block may be a rectangular block of samples on which the same transform is applied. A transform unit (TU) of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. Video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements that indicate the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate a RBSP for a picture parameter set (PPS), a second type of NAL unit may encapsulate a RBSP for a coded slice, a third type of NAL unit may encapsulate a RBSP for Supplemental Enhancement Information (SEI), and so on. For instance, a NAL unit may encapsulate a RBSP for a CRI SEI message. A PPS is a syntax structure that may contain syntax elements that apply to zero or more entire coded pictures. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. A RBSP for a coded slice may include a slice header and slice data.

Video decoder 30 may receive a bitstream. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use a motion vector or motion vectors of PUs to generate predictive blocks for the PUs.

In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive sample blocks for PUs of the current CU to corresponding samples of the transform blocks of the TUs of the current CU. By reconstructing the coding blocks for each CU of a picture, video decoder 30 may reconstruct the picture. Video decoder 30 may store decoded pictures in a decoded picture buffer for output and/or for use in decoding other pictures.

Next generation video applications are anticipated to operate with video data representing captured scenery with HDR (High Dynamic Range) and WCG (Wide Color Gamut). Parameters of the utilized dynamic range and color gamut are two independent attributes of video content, and their specification for purposes of digital television and multimedia services are defined by several international standards. For example, ITU-R Rec. 709 defines parameters for HDTV (high definition television), such as Standard Dynamic Range (SDR) and standard color gamut, and ITU-R Rec. 2020 specifies UHDTV (ultra-high definition television) parameters such as HDR and WCG. There are also other standards developing organization (SDOs) documents that specify dynamic range and color gamut attributes in other systems, e.g., P3 color gamut is defined in SMPTE-231-2 (Society of Motion Picture and Television Engineers) and some parameters of HDR are defined in STMPTE-2084. A brief description of dynamic range and color gamut for video data is provided below.

Figure 2:
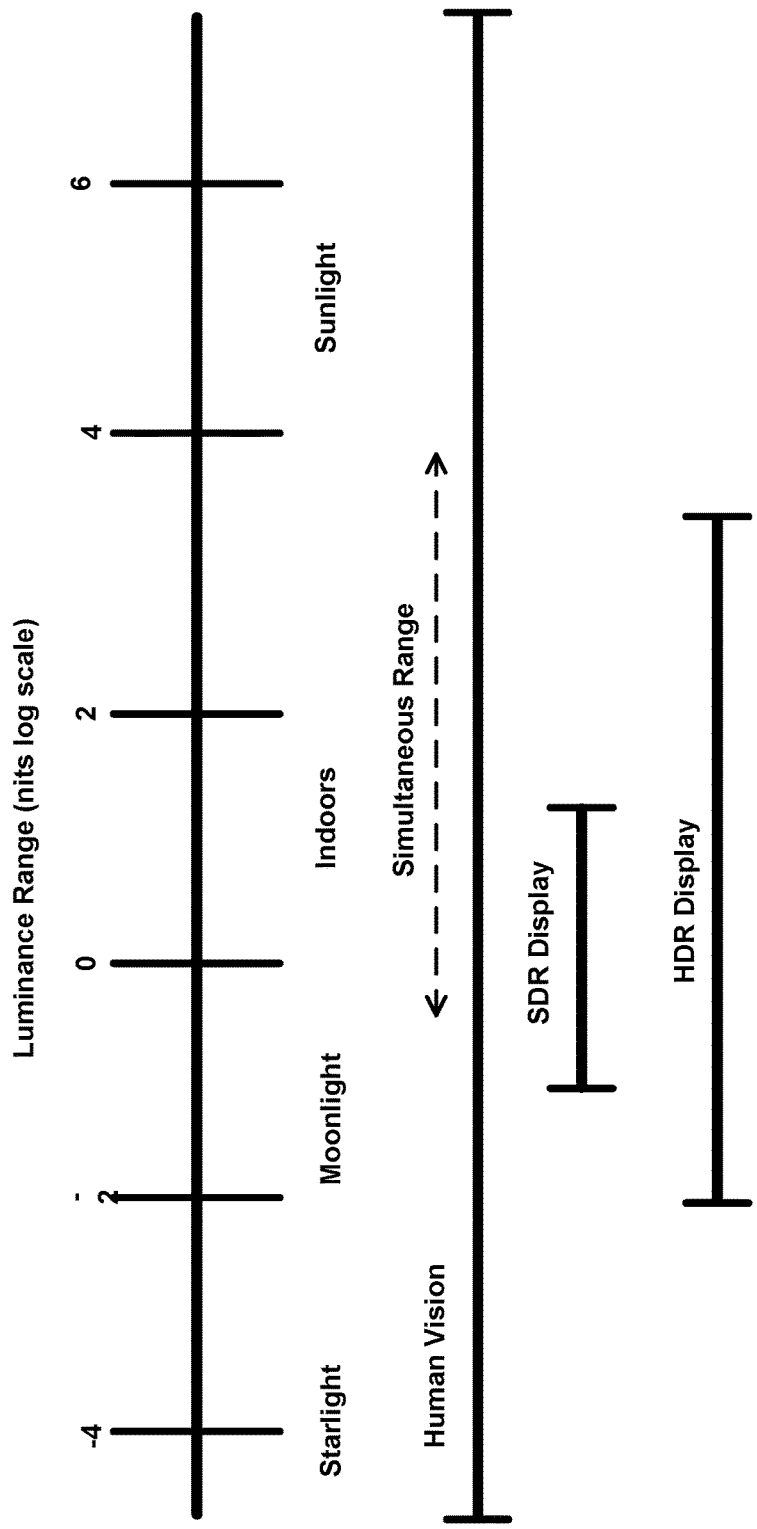
FIG. 2 is a drawing illustrating the concepts of high dynamic range (HDR) data.

Dynamic range is typically defined as the ratio between the minimum and maximum brightness of the video signal. Dynamic range may also be measured in terms of 'f-stop,' where one f-stop corresponds to a doubling of the signal dynamic range. In MPEG's definition, HDR content is such content that features brightness variation with more than 16 f-stops. In some terms, levels between 10 and 16 f-stops are considered as intermediate dynamic range, but may be considered HDR in other definitions. In some examples, HDR video content may be any video content that has a higher dynamic range than traditionally used video content with a standard dynamic range (e.g., video content as specified by ITU-R Rec. BT. 709). At the same time, the human visual system (HVS) is capable for perceiving much larger dynamic range. However, the HVS includes an adaptation mechanism to narrow a so-called simultaneous range. Visualization of dynamic range provided by SDR of HDTV, expected HDR of UHDTV and HVS dynamic range is shown in FIG. 2.

Current video applications and services are regulated by Rec.709 and provide SDR, typically supporting a range of brightness (or luminance) of around 0.1 to 100 candelas (cd) per meter squared (m2) (often referred to as "nits"), leading to less than 10 f-stops. The next generation video services are expected to provide dynamic range of up-to 16 f-stops. Although detailed specification is currently under development, some initial parameters have been specified in SMPTE-2084 and Rec. 2020.

Figure 3:
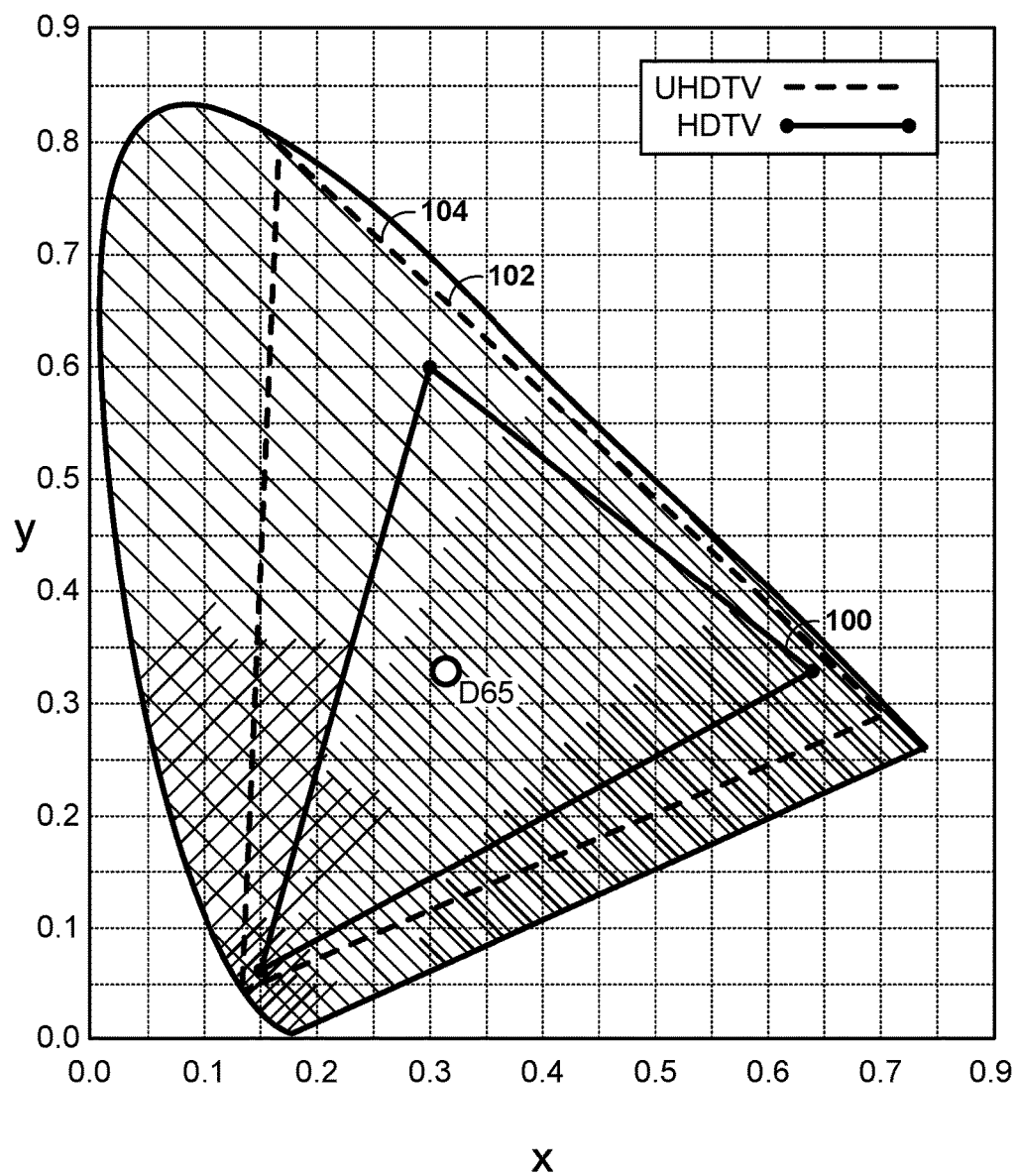
FIG. 3 is a conceptual diagram comparing of color gamuts of video signal of high definition television (HDTV) (BT.709) and ultra high definition television (UHDTV) (BT.2020).

Another aspect for a more realistic video experience besides HDR is the color dimension, which is conventionally defined by the color gamut. FIG. 3 is a conceptual diagram showing an SDR color gamut (triangle based on the BT.709 color red, green and blue color primaries), and the wider color gamut for UHDTV (triangle based on the BT.2020 color red, green and blue color primaries). FIG. 3 also depicts the so-called spectrum locus (delimited by the tongue-shaped area), representing limits of the natural colors. As illustrated by FIG. 3, moving from BT.709 to BT.2020 color primaries aim to provide UHDTV services with about 70% more colors. D65 specifies the white color for given specifications (e.g., BT.709 and/or BT.2020 specifications).

A few examples of color gamut specifications are shown below in Table 1.

TABLE 1

Color gamut parameters
RGB color space parameters

| | Color space | | | | | | | |
|---|---|---|---|---|---|---|---|---|
| | White point | | Primary colors | | | | | |
| | $xx_W$ | $yy_W$ | $xx_R$ | $yy_R$ | $xx_G$ | $yy_G$ | $xx_B$ | $y_B$ |
| DCI-P3 | 0.314 | 0.351 | 0.680 | 0.320 | 0.265 | 0.690 | 0.150 | 0.060 |
| ITU-R BT.709 | 0.3127 | 0.3290 | 0.64 | 0.33 | 0.30 | 0.60 | 0.15 | 0.06 |
| ITU-R BT.2020 | 0.3127 | 0.3290 | 0.708 | 0.292 | 0.170 | 0.797 | 0.131 | 0.046 |

As can be seen in Table 1, a color gamut may be defined by the x and y values of a white point, and by the x and y values of the primary colors (e.g., red (R), green (G), and blue (B). The x and y values are derived from X, Y, and Z coordinates where X and Z represent the chromaticity and Y the brightness of the colors, as is defined by the CIE 1931 color space. The CIE 1931 color space defines the links between pure colors (e.g., in terms of wavelengths) and how the human eye perceives such colors.

HDR/WCG is typically acquired and stored at a very high precision per component (even floating point), with the 4:4:4 chroma format and a very wide color space (e.g., CIE 1931 XYZ color space). This representation targets high precision and is (almost) mathematically lossless. However, this format feature may include a lot of redundancies and is not optimal for compression purposes. A lower precision format with HVS-based assumption is typically utilized for state-of-the-art video applications.

Typical video data format conversion for purposes of compression consists of three major processes, as shown in FIG. 4. The techniques of FIG. 4 may be performed by video preprocessor 19. Linear RGB data 110 may be HDR/WCG video data and may be stored in a floating-point representation. Linear RGB data 110 may be compacted using a non-linear transfer function (TF) for dynamic range compacting. For instance, video preprocessor 19 may include a transfer function unit (TF) unit 112 configured to use a non-linear transfer function for dynamic range compacting.

The output of TF unit 112 may be a set of codewords, where each codeword represents a range of color values (e.g., illumination levels). The TF unit 112 applies a non-linear function such that some ranges of the signal may be expanded and some parts may be contracted; several factors may determine the ranges that are expanded and compacted—the HVS and the perception of the colours at different luminance levels being some of the factors. For instance, the values in some ranges may be expanded when the HVS is (relatively) more perceptible to losses in that range, and compacted when the HVC is (relatively) less perceptible to changes in those regions. At the output of the TF unit 112, when the samples are still stored in floating point, ideally such compaction would not result in any loss of precision of the values as the inverse operation applied by the TF, if an inverse operation exists, would recover the input to the TF unit 112. However, in most practical systems floating points numbers are also stored with some limited precision and the compacting by the TF unit 112 will have some effect. In other examples, the dynamic range compacting may mean that the dynamic range of the linear RGB data 110 may be a first dynamic range (e.g., human vision range as illustrated in FIG. 2). The dynamic range of the resulting codewords may be a second dynamic range (e.g., HDR display range as illustrated in FIG. 2). Therefore, the codewords capture a smaller dynamic range than linear RGB data 110, and hence, TF unit 112 performs dynamic range compacting.

TF unit 112 performs non-linear functions in the sense that the mapping between the codewords and the input color values is not equally spaced (e.g., the codewords are non-linear codewords). Non-linear codewords means that changes in the input color values do not manifest as linearly proportional changes in the output codewords, but as non-linear changes in the codewords. For example, if the color values represent low illumination, then small changes in the input color values would result in small changes in the codewords outputted by TF unit 112. However, if the color values represent high illumination, then relatively large changes in the input color values would be needed for small changes in the codewords. The range of illumination represented by each codeword is not constant (e.g., a first codeword is the same for a first range of illuminations and a second codeword is the same for a second range of illuminations, and the first and second ranges are different).

As described in more detail, the techniques may scale and offset the linear RGB data 110 that TF unit 112 receives and/or scale and offset the codewords that TF unit 112 outputs to better utilize the codeword space. TF unit 112 may compact linear RGB data 110 (or scaled and offset RGB data) using any number of non-linear transfer functions (e.g., the PQ (perceptual quantizer) TF as defined in SMPTE-2084).

In some examples, color conversion unit 114 converts the compacted data into a more compact or robust color space (e.g., in YUV or Y'CbCr color space via a color conversion unit) that is more suitable for compression by video encoder 20. As described in more detail, in some examples, prior to color conversion unit 114 performing color conversion, the techniques may scale and offset the codewords that are outputted by the application of the TF by TF unit 112. Color conversion unit 114 may receive these scaled and offset codewords. In some examples, some scaled and offset codewords may be greater than or less than respective thresholds; for these, the techniques may assign a respective set codewords.

This data is then quantized using a floating-to-integer representation conversion (e.g., via a quantization unit 116) to produce the video data (e.g., HDR data 118) that is transmitted to video encoder 20 to be encoded. In this example HDR data 118 is in an integer representation. HDR data 118 may be now in a format more suitable for compression by video encoder 20. It should be understood that the order of the processes depicted in FIG. 4 is given as an example, and may vary in other applications. For example, color conversion may precede the TF process. In addition, video preprocessor 19 may apply more processing (e.g., spatial subsampling) to the color components.

Accordingly, in FIG. 4, the high dynamic range of input RGB data 110 in linear and floating-point representation is compacted with the utilized non-linear transfer function by TF unit 112, e.g. PQ TF as defined in SMPTE-2084, following which it is converted to a target color space (e.g., by color conversion unit 114) that is more suitable for compression, e.g. Y'CbCr, and then quantized (e.g., quantization unit 116) to achieve integer representation. The order of these elements is given as an example, and may vary in real-world applications, e.g., color conversion may precede the TF module (e.g., TF unit 112). Additional processing as such spatial subsampling may be applied to color components prior to TF unit 112 applying the transfer function.

The inverse conversion at the decoder side is depicted in FIG. 5. The techniques of FIG. 5 may be performed by video postprocessor 31. For example, video postprocessor 31 receives video data (e.g., HDR data 120) from video decoder 30 and inverse quantization unit 122 may inverse quantize the data, inverse color conversion unit 124 performs inverse color conversion, and inverse non-linear transfer function unit 126 performs inverse non-linear transfer to produce linear RGB data 128.

The inverse color conversion process that inverse color conversion unit 124 performs may be the inverse of the color conversion process that color conversion unit 114 performed. For example, the inverse color conversion unit 124 may convert the HDR data from a Y'CbCr format back to an RGB format. Inverse transfer function unit 126 may apply the inverse transfer function to the data to add back the dynamic range that was compacted by TF unit 112 to recreate the linear RGB data 128.

In the example techniques described in this disclosure, prior to the inverse transfer function unit 126 performing inverse transfer function, video postprocessor 31 may apply inverse post-processing and, after inverse transfer function unit 126 performs the inverse transfer function, may apply inverse pre-processing. For example, as described above, in some examples, video preprocessor 19 may apply pre-processing (e.g., scaling and offsetting) prior to TF unit 112 and may apply post-processing (e.g., scaling and offsetting) after TF unit 112. To compensate for the pre- and post-processing, video postprocessor 31 may apply the inverse post-processing prior to inverse TF unit 126 performing inverse transfer function and inverse pre-processing after inverse TF unit 126 performs inverse transfer function. Applying both pre- and post-processing and inverse post- and inverse pre-processing may be optional. In some examples, video preprocessor 19 may apply one, but not both of, pre- and post-processing, and for such examples, video postprocessor 31 may apply the inverse of the processing applied by video preprocessor 19.

Figure 6:
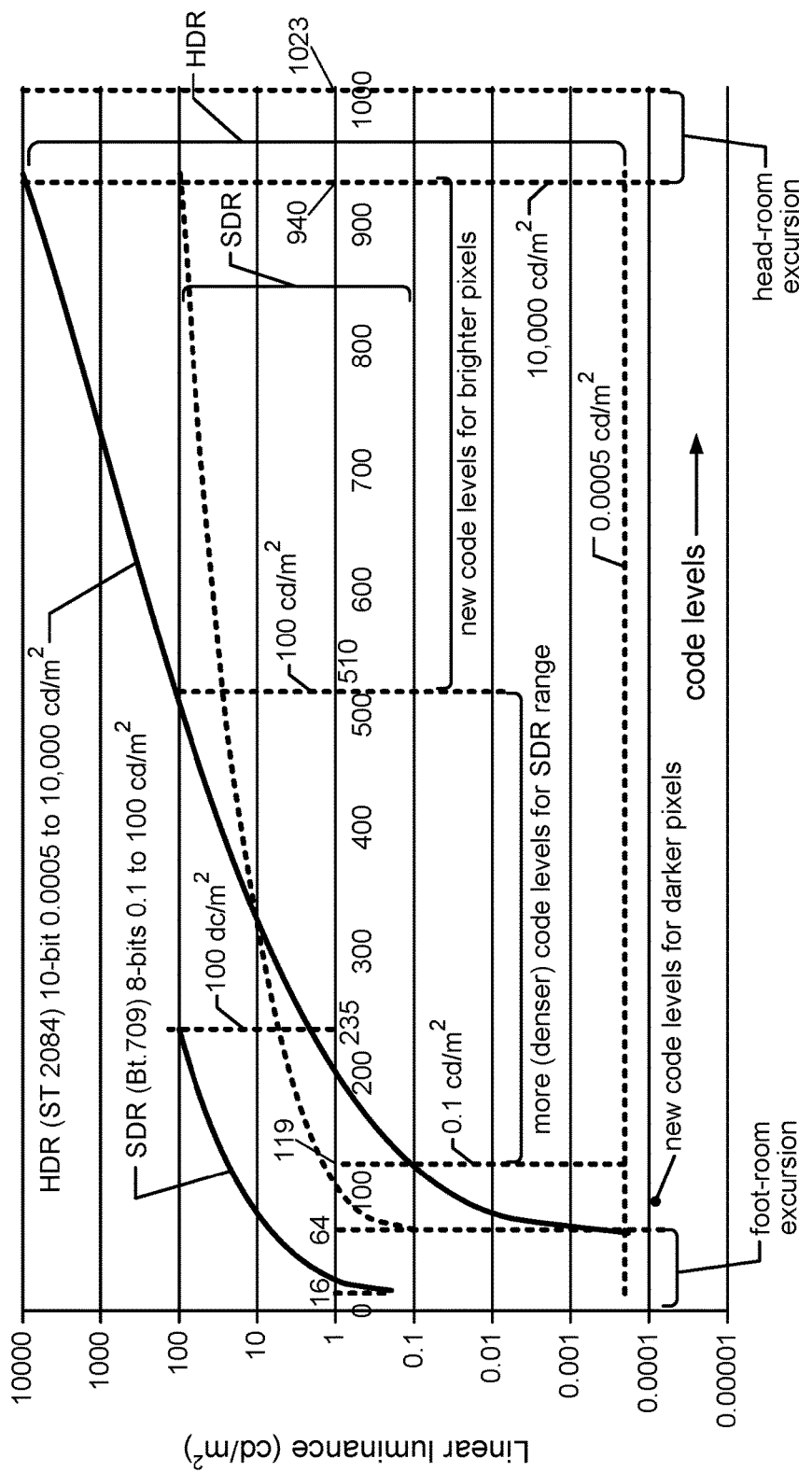
FIG. 6 is conceptual diagram showing several examples of transfer functions.

The example video preprocessor 19 illustrated in FIG. 4 is described in further detail, with the understanding that the example video postprocessor 31 illustrated in FIG. 5 performs the general reciprocal. A transfer function is applied to the data (e.g., HDR/WCG RGB video data) to compact its dynamic range and make it possible to represent the data with a limited number of bits. These limited number of bits that represent the data are referred to as codewords. This function is typically a one-dimensional (1D) non-linear function either reflecting inverse of electro-optical transfer function (EOTF) of the end-user display as specified for SDR in Rec.709 or approximating the HVS perception to brightness changes as for PQ TF specified in SMPTE-2084 for HDR. The inverse process (e.g., as performed by video postprocessor 31) of the OETF is the EOTF (electro-optical transfer function), which maps the code levels back to luminance. FIG. 6 shows several examples of non-linear TFs. These transfer functions may also be applied to each R, G and B component separately.

In the context of this disclosure, the terms "signal value" or "color value" may be used to describe a luminance level corresponding to the value of a specific color component (such as R, G, B, or Y) for an image element. The signal value is typically representative of a linear light level (luminance value). The terms "code level," "digital code value," or "codeword" may refer to a digital representation of an image signal value. Typically, such a digital representation is representative of a nonlinear signal value. An EOTF represents the relationship between the nonlinear signal values provided to a display device (e.g., display device 32) and the linear color values produced by the display device.

RGB data, such as linear RGB data 110, may be utilized as input, since it is produced by image capturing sensors. However, this color space (i.e., the RGB color space) has high redundancy among its components and may not be optimal for compact representation. To achieve more compact and more robust representation, RGB components may be converted to a more uncorrelated color space more suitable for compression, e.g. Y'CbCr. This color space separates the brightness in the form of luminance and color information in different less correlated components.

As discussed above, following processing by color conversion unit 114, the input data may be in a target color space still represented at high bit-depth (e.g. floating-point accuracy) is converted to a target bit-depth. Certain studies show that 10-12 bits accuracy in combination with the PQ TF is sufficient to provide HDR data of 16 f-stops with distortion below the Just-Noticeable Difference. Data represented with 10 bits accuracy can be further coded with most of the state-of-the-art video coding solutions. This quantization is an element of lossy coding and may be a source of inaccuracy introduced into converted data.

Supplemental Enhancement information (SEI) messages are included in video bitstreams, typically to carry information that may not be essential to decode the bitstream by the decoder. This information may be useful in improving the display or processing of the decoded output; e.g. such information could be used by decoder-side entities to improve the viewability of the content.

It is also possible that certain application standards (e.g., DVB, ATSC) mandate the presence of such SEI messages in the bitstream so that the improvement in quality can be brought to all devices that conform to the application standard (the carriage of the frame-packing SEI message for frame-compatible plano-stereoscopic 3DTV video format, where the SEI message is carried for every frame of the video (see ETSI-TS 101 547-2, *Digital Video Broadcasting (DVB) Plano-stereoscopic 3DTV; Part 2: Frame compatible plano-steroscopic 3DTV*), handling of recovery point SEI message in 3 GPP TS 26.114 v13.0.0, *3rd Generation Partnership Project; Technical Specification Group Services* and System Aspects; IP Multimedia Subsystem (IMS); Multimedia Telephony; Media handling and interaction (Release 13), use of pan-scan scan rectangle SEI message in DVB (see ETSI-TS 101 154, *Digital Video Broadcasting (DVB); Specification for the use of Video and Audio Coding in Broadcasting Applications based on the MPEG-2 Transport Stream*).

The colour remapping information SEI message defined in the HEVC standard is used to convey information that is used to map pictures in one colour space to another. The syntax of the CRI SEI message includes three parts: a first set of three 1-D look-up tables (Pre-LUT), followed by a 3×3 matrix, followed by second set of three 1-D look-up tables (Post-LUT). For each color component, e.g. R,G,B or Y,Cb,Cr, independent LUT is defined for both Pre-LUT and Post-LUT.

Figure 7:
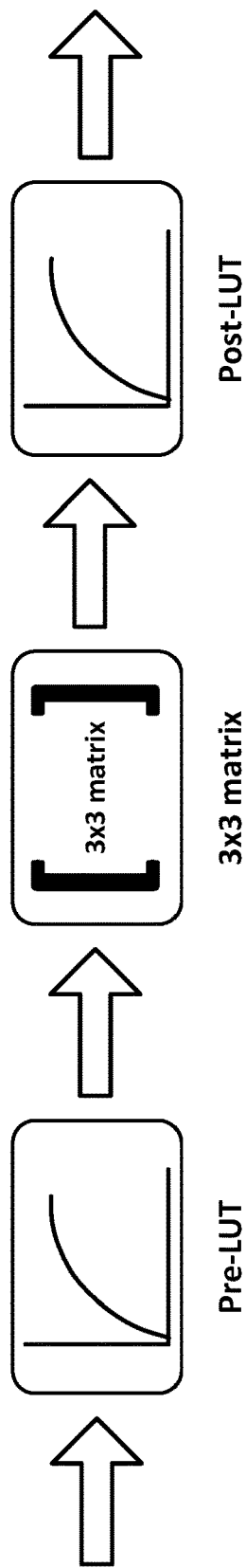
FIG. 7 is a conceptual diagram showing a typical structure of a colour remapping information/process used by video decoder when applying a CRI SEI message.

The CRI SEI message includes syntax element called colour_remap_id, different values of which may be used to indicate different purposes of the SEI message. FIG. 7 shows a typical structure of the colour remapping information/process used by the CRI SEI message. An example syntax table of a CRI SEI message is reproduced in Table 2 below.

TABLE 2

CRI SEI Message

| colour_remapping_info( payloadSize ) { | Descriptor |
|---|---|
| colour_remap_id | ue(v) |
| colour_remap_cancel_flag | u(1) |
| if( !colour_remap_cancel_flag ) { | |
|   colour_remap_persistence_flag | u(1) |
|   colour_remap_video_signal_info_present_flag | u(1) |
|   if( colour_remap_video_signal_info_present_flag ) { | |
|     colour_remap_full_range_flag | u(1) |
|     colour_remap_primaries | u(8) |
|     colour_remap_transfer_function | u(8) |
|     colour_remap_matrix_coefficients | u(8) |
|   } | |
|   colour_remap_input_bit_depth | u(8) |
|   colour_remap_bit_depth | u(8) |
|   for( c = 0; c < 3; c++ ) { | |
|     pre_lut_num_val_minus1[ c ] | u(8) |
|     if( pre_lut_num_val_minus1[ c ] > 0 ) | |
|       for( i = 0; i <= pre_lut_num_val_minus1[ c ]; i++ ) { | |
|         pre_lut_coded_value[ c ][ i ] | u(v) |
|         pre_lut_target_value[ c ][ i ] | u(v) |
|       } | |
|   } | |
|   colour_remap_matrix_present_flag | u(1) |
|   if( colour_remap_matrix_present_flag ) { | |
|     log2_matrix_denom | u(4) |
|     for( c = 0; c < 3; c++ ) | |
|       for( i = 0; i < 3; i++ ) | |
|         colour_remap_coeffs[ c ][ i ] | se(v) |
|   } | |
|   for( c = 0; c < 3; c++ ) { | |
|     post_lut_num_val_minus1[ c ] | u(8) |
|     if( post_lut_num_val_minus1[ c ] > 0 ) | |
|       for( i = 0; i <= post_lut_num_val_minus1[ c ]; i++ ) { | |
|         post_lut_coded_value[ c ][ i ] | u(v) |
|         post_lut_target_value[ c ][ i ] | u(v) |
|       } | |
|     } | |
|   } | |
| } | |
| } | |

Some semantics of CRI SEI messages that are helpful for description in this document are described below. Complete semantics are available in section D.3.32 of the HEVC standard (available at H.265: High Efficiency Video Coding (HEVC), http://www.itu.int/rec/T-REC-H.265-201504-I/en).

The colour remapping information SEI message provides information to enable remapping of the reconstructed colour samples of the output pictures. The colour remapping information may be applied directly to the decoded sample values, regardless of whether they are in the luma and chroma domain or the RGB domain. The colour remapping model used in the colour remapping information SEI message is composed of a first piece-wise linear function applied to each colour component (specified by the "pre" set of syntax elements herein), a three by-three matrix applied to the three colour components, and a second piece-wise linear function applied to each colour component (specified by the "post" set of syntax elements herein).

colour_remap_id contains an identifying number that may be used to identify the purpose of the colour remapping information. The value of colour_remap_id shall be in the range of 0 to $2^{32}-2$, inclusive.

Values of colour_remap_id from 0 to 255 and from 512 to $2^{31}-1$ may be used as determined by the application. Values of colour_remap_id from 256 to 511, inclusive, and from $2^{31}$ to $2^{32}-2$, inclusive are reserved for future use by ITU-T|ISO/IEC. Decoders shall ignore all colour remapping information SEI messages containing a value of colour_remap_id in the range of 256 to 511, inclusive, or in the range of $2^{31}$ to $2^{32}-2$, inclusive, and bitstreams shall not contain such values.

The colour_remap_id can be used to support different colour remapping processes that are suitable for different display scenarios. For example, different values of colour_remap_id may correspond to different remapped colour spaces supported by displays.

colour_remap_matrix_coefficients has the same semantics as specified in clause E.3.1 for the matrix_coeffs syntax element, except that colour_remap_matrix_coefficients specifies the colour space of the remapped reconstructed picture, rather than the colour space used for the CLVS. When not present, the value of colour_remap_matrix_coefficients is inferred to be equal to the value of matrix_coeffs.

colour_remap_input_bit_depth specifies the bit depth of the luma and chroma components or the RGB components of the associated pictures for purposes of interpretation of the colour remapping information SEI message. When any colour remapping information SEI messages is present with the value of colour_remap_input_bit_depth not equal to the bit depth of the coded luma and chroma components or that of the coded RGB components, the SEI message refers to the hypothetical result of a transcoding operation performed to convert the coded video to a converted video with bit depth equal to colour_remap_input_bit_depth.

The value of colour_remap_input_bit_depth shall be in the range of 8 to 16, inclusive. Values of colour_remap_input_bit_depth from 0 to 7, inclusive, and from 17 to 255, inclusive, are reserved for future use by ITU-T|ISO/IEC. Decoders shall ignore all colour remapping SEI messages that contain a colour_remap_input_bit_depth in the range of 0 to 7, inclusive, or in the range of 17 to 255, inclusive, and bitstreams shall not contain such values.

colour_remap_bit_depth specifies the bit depth of the output of the colour remapping function described by the colour remapping information SEI message.

The value of colour_remap_bit_depth shall be in the range of 8 to 16, inclusive. Values of colour_remap_bit_depth from 0 to 7, inclusive, and in the range of 17 to 255, inclusive, are reserved for future use by ITU-T|ISO/IEC. Decoders shall ignore all colour remapping SEI messages that contain a value of colour_remap_bit_depth from 0 to 7, inclusive, or in the range of 17 to 255, inclusive.

pre_lut_num_val_minus1[c] plus 1 specifies the number of pivot points in the piece-wise linear remapping function for the c-th component, where c equal to 0 refers to the luma or G component, c equal to 1 refers to the Cb or B component, and c equal to 2 refers to the Cr or R component. When pre_lut_num_val_minus1[c] is equal to 0, the default end points of the input values are 0 and $2^{colour\_remap\_input\_bit\_depth}-1$, and the corresponding default end points of the output values are 0 and $2^{colour\_remap\_bit\_depth}-1$, for the c-th component. In bitstreams conforming to this version of this Specification, the value of pre_lut_num_val_minus1[c] shall be in the range of 0 to 32, inclusive.

pre_lut_coded_value[c][i] specifies the value of the i-th pivot point for the c-th component. The number of bits used to represent pre_lut_coded_value[c][i] is ((colour_remap_input_bit_depth+7)>>3)<<3.

pre_lut_target_value[c][i] specifies the value of the i-th pivot point for the c-th component. The number of bits used to represent pre_lut_target_value[c][i] is ((colour_remap_bit_depth+7)>>3)<<3.

The semantics of post_lut_num_val_minus[ ], post_lut_coded_value[ ][ ], and post_lut_target_value[ ][ ] are similar to the semantics of pre_lut_num_val_minus[ ], pre_lut_coded_value[ ][ ], and pre_lut_target_value[ ][ ], respectively; the number of bits used to represent post_lut_coded_value[ ][ ], and post_lut_target_value[ ][ ] is equal to colour_remap_bit_depth.

However, there may be one or more disadvantages with the above-described colour remapping information SEI message. As one example, the processes of the CRI SEI message, such as the look-up table, can be applied after dequantization, filtering/upsampling the decoded samples, or after performing colour space conversion of the decoded samples. As defined in HEVC, the decoder is not instructed as to where in the processing chain the CRI SEI message is to be applied. This lack of instruction may lead different video decoders to output different results, which may be undesirable.

As another example, specification of the CRI SEI message includes the syntax element colour_remap_id to indicate the purpose of the SEI message, however its semantics do not specify processing of concurrent or sequential CRI SEI messages with different IDs, and whether such SEI messages may be carried, and/or whether such concurrent or sequential CRI SEI messages may applied.

As another example, CRI SEI can be applied to adapt the output of the decoder to a specific display. That is, CRI SEI can be used for display adaptation to a target display. A display can be defined by its peak brightness and colour gamut, among other characteristics. However, the CM SEI does not indicate some of these characteristics of the target display, notably, the peak brightness. The CRI SEI indicates the container of the output (i.e., the meaning of the pixel values), but not the intended use of that output, and specifically, for what kind of display is the output.

In accordance with one or more techniques of this disclosure, the CRI SEI message signalling may be used for display adaptation. Application standards like DVB and ATSC can modify or further specify aspects of the SEI messages in order to make these SEI messages more useful for their use case. This disclosure describes techniques for using the CRI SEI message signalling from the point of view of these application standards, though the techniques of this disclosure may be used with other standards. One or more of the techniques of this disclosure may be applied independently, or in combination with others.

A single video bitstream may be used by video decoders to render video data for different displays. The displays may be considered different in that they may have different display characteristics. Example display characteristics include, but are not limited to, peak brightness (e.g., peak luminance), color space, and the like. For example, a first display may have a peak brightness of 300 nits and a second display may have a peak brightness of 1000 nits.

In accordance with one or more techniques of this disclosure, a video coding unit (i.e., video encoding unit 21 and/or video decoding unit 29) may signal one or more colour remapping messages (e.g., CRI SEI messages) that each correspond to a different target display. For purposes of this disclosure, a target display may not necessarily be a particular physical display but may instead refer to a theoretical display with certain display characteristics. As one example, video encoding unit 21 may output a bitstream that includes one or more colour remapping messages that each correspond to a respective peak brightness value of a set of peak brightness values. Each of the peak brightness values may indicate the respective peak brightness value of a target display. In some examples, the colour remapping messages may be CRI SEI messages. For instance, video encoding unit 21 may output a bitstream that includes a first CRI SEI message that corresponds to a first peak brightness value (e.g., 300 nits) and a second CRI SEI message that corresponds to a second peak brightness value (e.g., 700 nits). Video decoding unit 29 may select a message of the colour remapping messages based on display characteristics of a display that is to display the video data (e.g., display device 32 of FIG. 1). Some display characteristics that video decoding unit 29 may use to select the message include colour gamut, a peak brightness, and supported transfer functions. As such, video decoding unit 29 may select a CRI SEI message based on the colour_remap_id syntax element, the colour_remap_primaries syntax element, and/or the colour_remap_transfer_function syntax element.

In this way, techniques of this disclosure enable a video decoding unit to perform colour remapping of video data in a way that is tailored to display characteristics of a display that is to display the video data.

The CRI SEI messages may each include a syntax element that indicates the peak brightness value to which the CRI SEI message corresponds. For instance, a video coding unit may signal the colour_remap_id syntax element of the CRI SEI message with a value that indicates the value in nits (cd/m2) of the peak luminance of the target display corresponding to the CRI SEI message. As one example, a video coding unit may signal a first CRI SEI message with a colour_remap_id syntax element that indicates that the first CRI SEI message corresponds to a first peak brightness value (e.g., 300 nits) and a second CRI SEI message with a colour_remap_id syntax element that indicates that the second CRI SEI message corresponds to a second peak brightness value (e.g., 700 nits).

In some examples, the signalling of the peak brightness values may be constrained. As one example, the peak brightness values may be constrained between a lower bound (e.g., 50 nits, 100 nits, etc.) and an upper bound (e.g., 10,000 nits, 15,000 nits, etc.). As another example, the peak brightness values may be signaled in steps of 50 nits, 100 nits, etc.

Where a CRI SEI message includes a syntax element that indicates the peak brightness value to which the CRI SEI message corresponds, the value of the syntax element may be represented according to the following formula:

$$Tml = 100 * \text{ceil}\left(\frac{colour\_remap\_id + 1}{2}\right)$$

where Tml is the peak brightness value corresponding to the CRI SEI message (e.g., the maximum luminance of the target display), colour_remap_id is the colour_remap_id syntax element included in the CRI SEI message, and ceil is an upward rounding function.

In accordance with one or more techniques of this disclosure, a video coding unit may signal a colour remapping message (e.g., CRI SEI message) that indicates whether the information of the color remapping message is applied either directly to decoded samples of video data or to the samples after some processing (e.g., whether a video decoding unit is to apply the colour remapping process directly to decoded samples of video data or to the samples after some processing). For instance, the semantics of the colour_remap_id syntax element can be changed so that this syntax element also conveys the information that the message is applied either directly to the decoded samples or to samples after some processing (e.g., after conversion of the decoded samples to the RGB domain from the Y'CbCr domain). As one example, a video coding unit may signal the colour_remap_id element with a first value (e.g., 0 or even) to indicate that the information of the colour remapping message is to be applied to the decoded samples of video data in the Y'CbCr domain. As another example, a video coding unit may signal the colour_remap_id element with a second value (e.g., 1 or odd) to indicate that the information of the colour remapping message is to be applied to the decoded samples of video data after conversion into the RGB domain.

Additionally, or alternatively, the input color space of CRI SEI can be imposed to be the same as the output color space, for example, as signalled by syntax elements colour_remap, colour_remap_matrix_coefficients and colour_remap_transfer_function of the CRI SEI message. In either or both of these ways, a decoder (such as video decoding unit 29), may determine where in the processing chain the CRI SEI is to be applied.

As discussed above, in some examples, the colour_remap_id syntax element of a CRI SEI message may indicate a peak brightness of a target display to which the CRI SEI message corresponds. As also discussed above, in some examples, the same colour_remap_id syntax element may indicate whether the information of the CRI SEI is applied either directly to decoded samples of video data or to the samples after some processing. As such, in some examples, the colour_remap_id syntax element in a CRI SEI message may indicate both the peak brightness of a target display corresponding to the CRI SEI message and whether the video decoder is to apply the information of the selected CRI SEI message directly to decoded samples of video data or to the samples after some processing.

In accordance with one or more techniques of this disclosure, a video coding unit may ensure the persistence of a colour remapping message for a specific target display in a bitstream. The signalling may mandate that if a CRI SEI with a specific target display is present at a random-access picture (RAP), such as an intra random-access picture (IRAP), then it should also be present in the following RAPs. As such, if a video coding unit signals, for a current IRAP in a bitstream, a set of colour remapping messages that includes one or more colour remapping messages that each correspond to a respective peak brightness value of a set of peak brightness values, the video coding unit will also signal, for subsequent IRAPs in the bitstream, a respective set of colour remapping messages that includes one or more color remapping messages that each correspond to a respective peak brightness value of the same set of peak brightness values.

In some examples, a "target display" may be determined based on values of one or more of the following CRI SEI syntax elements: colour_remap_id, colour_remap_primaries, and colour_remap_transfer_function. Additionally, or alternatively, the target display can be determined by the value of other syntax elements. In this way, a video decoding unit may rely on the metadata for display adaptation for the bitstream.

In accordance with one or more techniques of this disclosure, a video coding unit may limit the bitdepth of the input/output of the colour mapping process. For example, a video coding unit may impose that colour_remap_input_bit_depth and colour_remap_bit_depth shall be set to "8", "10" or "12". In one specific example, a video coding unit may impose that colour_remap_input_bit_depth shall be set to "10." In this way, the complexity (e.g., memory and processing requirements) of the colour remapping process may be constrained.

The examples described above can be combined in several ways. For example, in the context of DVB (TS 101 154), it may be recommended that HEVC HDR UHDTV Bitstreams using PQ10 contain colour remapping information SEI messages as specified in Recommendation ITU-T H.265/ISO/IEC 23008-2 [35] clause D.3.32. If a colour remapping information SEI message is present, one or more of the following constraints apply:

The CRI SEI message shall be transmitted at least at each HEVC DVB_RAP.
The syntax element colour_remap_video_signal_info_present_flag shall be set to "1", so that colour_remap_full_range_flag, colour_remap_primaries, colour_remap_transfer_junction, colour_remap_matrix_coefficients are present.
colour_remap_primaries shall be set to "1" or "9".
colour_remap_matrix_coefficients shall be set to "0", "1" or "9".
colour_remap_transfer_junction shall be set to "1", "14" or "16".
colour_remap_input_bit_depth and colour_remap_output_bit_depth shall be set to "8", "10" or "12".
Changes to any of the syntax elements colour_remap_full_range_flag, colour_remap_primaries, colour_remap_transfer_junction, colour_remap_matrix_coefficients, colour_remap_input_bit_depth and colour_remap_output_bit_depth shall only occur at a HEVC DVB_RAP.
colour_remap_id shall be set to less than "256".
Input colour coefficients shall be determined by the colour_remap_id syntax element value as follows:
When colour_remap_id is even, the input is in Y'CbCr
When colour_remap_id is odd, the input is in GBR
Target maximum luminance after remapping (in cd/m2) shall be determined by the colour_remap_id syntax element as follows:
$T_{ml}$=100*ceil((colour_remap_id+1)/2)
When a colour remapping information SEI message is present for a particular target display in an HEVC DVB_RAP picture, a colour remapping information SEI message shall be present for the same target display at least for each subsequent HEVC DVB_RAP. A "target display" is determined by the value of the syntax elements colour_remap_id, colour_remap_primaries, and colour_remap_transfer_junction.

Figure 8:
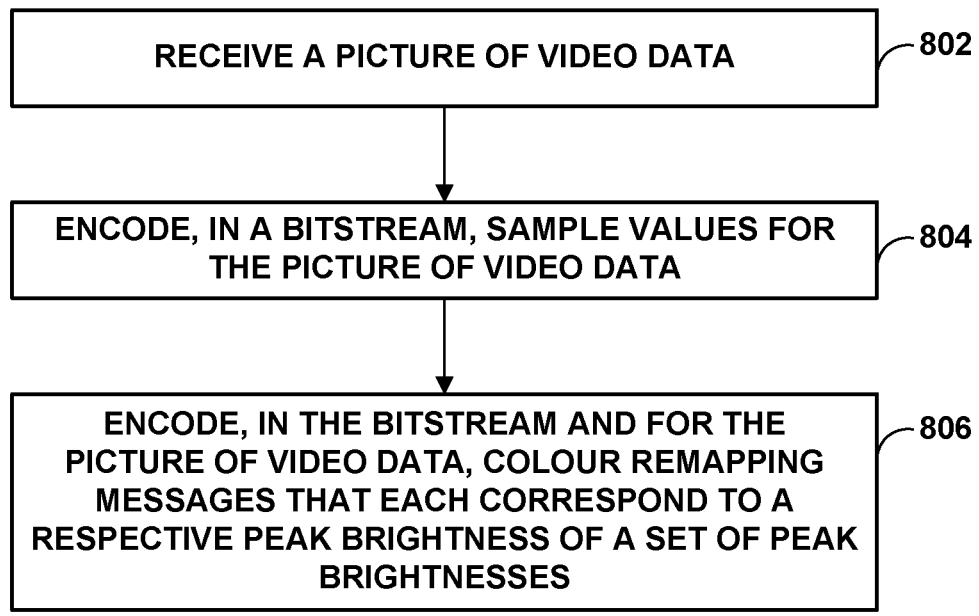
FIG. 8 is a flowchart illustrating an example method for encoding a picture of video data with one or more colour remapping messages in accordance with the techniques of this disclosure.

FIG. 8 is a flowchart illustrating an example method for encoding a picture of video data with one or more colour remapping messages in accordance with the techniques of this disclosure. For purposes of explanation, the method of FIG. 8 is described below as being performed by video encoding unit 21 and the components thereof (e.g., illustrated in FIG. 1), though the method of FIG. 8 may be performed by other video encoding units.

Video encoding unit 21 may receive a picture of video data (802). For instance, video encoder 20 may receive samples of a current picture of video data from video preprocessor 19. Video encoding unit 21 may encode, in a bitstream, samples values for the picture of video data (804). For instance, video encoder 20 may encode samples/pixel values of the current picture of video data using any combination of inter and intra encoding modes. In some examples, video encoder 20 may encode the samples using H.265/HEVC.

Video encoding unit 21 may encode, in the bitstream and for the picture of video data, one or more colour remapping messages that each correspond to a respective peak brightness value of a set of peak brightness values (806). For instance, video encoding unit 21 may encode one or more CRI SEI messages that each correspond to a respective peak brightness value of a set of peak brightness values. As one example, video encoding unit 21 may output a bitstream that includes a first CRI SEI message that corresponds to a first peak brightness value (e.g., 300 nits) and a second CRI SEI message that corresponds to a second peak brightness value (e.g., 700 nits). In this way, video encoding unit 21 may enable a video decoding unit to perform colour remapping of video data in a way that is tailored to display characteristics of a display which is to display the video data.

In some cases, the colour remapping messages that correspond to a respective peak brightness may be determined by video encoding unit 21 using a pre-defined algorithm. Video encoding unit 21 may input the video, analyze the content and use a pre-defined algorithm to determine the mapping parameters to be applied to the content. This algorithm may have been derived based on relation between the display characteristics and the characteristics of the video. In other cases, the generation/derivation of the colour remapping messages at video encoding unit 21 may be aided by parameters that be provided to video encoding unit 21 using another device that is capable of deriving such parameters, or by processes that occur outside video encoding unit 21. For example, several processes in the post-production workflow of content creation may be capable of generating parameters that enable derivation of colour remapping parameters. The parameters provided to video encoding unit 21 may then be used by a pre-defined algorithm to derive the colour remapping messages. In other cases, the colour remapping parameters may be derived entirely outside video encoding unit 21, and the provided to video encoding unit 21, and video encoding unit 21 may merely be translating those parameters to the colour remapping messages in the syntax of the video bitstream. These are some examples of how video encoding unit 21 may generate the colour remapping messages; it must be understood that there may be other methods of such generation and the techniques described herein also apply to those methods.

In some examples, if video encoding unit 21 encodes, for a current IRAP in a bitstream, a set of colour remapping messages that includes one or more colour remapping messages that each correspond to a respective peak brightness value of a set of peak brightness values, the video encoding unit 21 will also encode, for subsequent IRAPs in the bitstream, a respective set of colour remapping messages that includes one or more color remapping messages that each correspond to a respective peak brightness value of the same set of peak brightness values. For example, if video encoding unit 21 encodes a first CRI SEI message that corresponds to a first peak brightness value (e.g., 300 nits) and a second CRI SEI message that corresponds to a second peak brightness value (e.g., 700 nits) for a current IRAP in a bitstream, video encoding unit 21 will also encode a respective first CRI SEI message that corresponds to a first peak brightness value (e.g., 300 nits) and a respective second CRI SEI message that corresponds to a second peak brightness value (e.g., 700 nits) for all subsequent IRAPs in the bitstream. In this way, a video decoding unit may rely on the metadata for display adaptation for the bitstream.

As discussed above, in some examples, the CRI SEI messages may include a syntax element that indicates the corresponding peak brightness value. For instance, video encoding unit 21 may output a bitstream that includes a first CRI SEI message having a colour_remap_id syntax element with a value that represents a first peak brightness value (e.g., 300 nits) and a second CRI SEI message having a colour_remap_id syntax element with a value that represents a second peak brightness value (e.g., 700 nits). In some examples, each of the CRI SEI messages may further include one or more syntax elements that specify the bit depth of the input video data (i.e., colour_remap_input_bit_depth) and/or the bit depth of the output video data (i.e., colour_remap_bit_depth). In some examples, the syntax element that specifies the bit depth of the input video data and syntax element that specifies the bit depth of the output video data may both be set to a particular value, such as "8," "10,", or "12." In this way, the complexity (e.g., memory and processing requirements) of the colour remapping process may be constrained.

Figure 9:
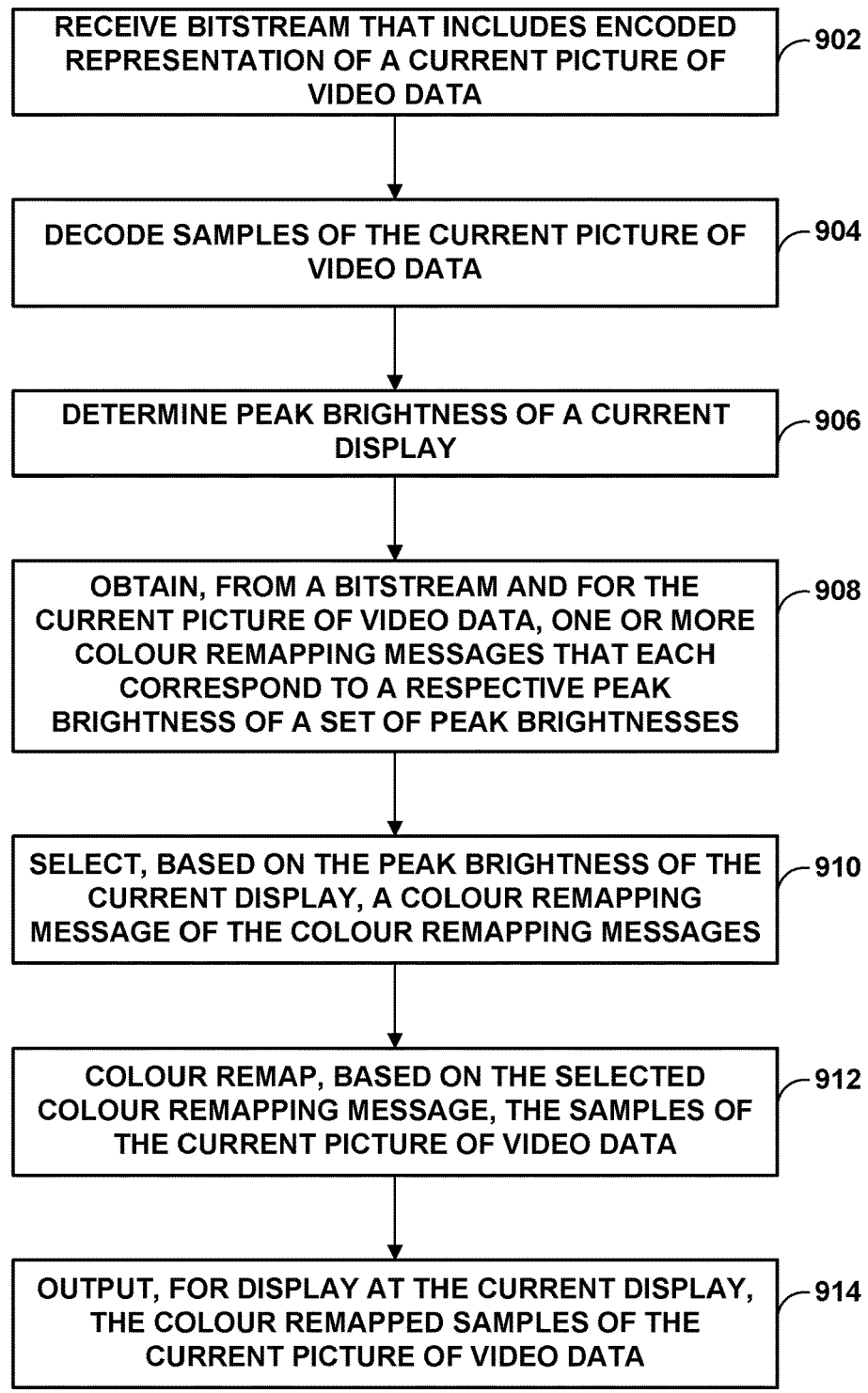
FIG. 9 is a flowchart illustrating an example method for decoding a picture of video data with one or more colour remapping messages in accordance with the techniques of this disclosure.

FIG. 9 is a flowchart illustrating an example method for decoding a picture of video data with one or more colour remapping messages in accordance with the techniques of this disclosure. For purposes of explanation, the method of FIG. 9 is described below as being performed by video decoding unit 29 and the components thereof (e.g., illustrated in FIG. 1), though the method of FIG. 9 may be performed by other video decoding units.

Video decoding unit 29 may receive a bitstream that includes an encoded representation of a current picture of video data (902) and decode samples of the current picture of video data (904). For instance, video decoder 30 may receive the bitstream and decode the samples using any combination of inter and intra prediction modes. In some examples, video decoder 30 may decode the samples using H.265/HEVC.

Video decoding unit 29 may determine a peak brightness value of a current display (906). For instance, video decoding unit 29 may determine a peak brightness value of display device 32. As one example, such as where display 32 is integrated into the same device as video decoding unit 29, the peak brightness value of display 32 may be a variable stored in memory accessibly by video decoding unit 29. As another example, video decoding unit 29 may receive data from display 32 that indicates the peak brightness value of display 32 (e.g., via an Extended Display Identification Data (EDID) data channel).

Video decoding unit 29 may obtain, from the bitstream and for the current picture of video data, one or more colour remapping messages that each correspond to a respective peak brightness value of a set of peak brightness values (908). For instance, video decoding unit 29 may obtain a first CRI SEI message that corresponds to a first peak brightness value (e.g., 300 nits), a second CRI SEI message that corresponds to a second peak brightness value (e.g., 500 nits), and a third CRI SEI message that corresponds to a third peak brightness value (e.g., 1000 nits). As discussed above, in some examples, the CRI SEI messages may include a colour_remap_id syntax element that indicates the corresponding peak brightness value.

Video decoding unit 29 may select, based on the peak brightness value of the current display, a colour remapping message of the one or more colour remapping messages (910). As one example, video decoding unit 29 may select the color remapping message that corresponds to a peak brightness value that most closely matches the peak brightness value of the current display. As another example, video decoding unit 29 may select the color remapping message with the greatest corresponding peak brightness value that is less than or equal to the peak brightness value of the current display. In other examples, the video decoding unit 29 may select the colour remapping message corresponding to a particular peak brightness based on some pre-defined algorithm or look-up table based on the peak brightness of the display.

In some examples, in addition to and/or in place of the peak brightness of the current display, video decoding unit 29 may select the colour remapping message of the plurality of colour remapping messages based on a colour gamut of the current display and/or which transfer functions are supported by the current display. In other words, video decoding unit 29 may select the CRI SEI message based on the colour_remap_id syntax element, the colour_remap_primaries syntax element, and/or the colour_remap_transfer_function syntax element. For example, video decoding unit 29 may receive a first message MSG1 with a colour_remap_id syntax element indicating a peak brightness of 100 nits, a colour_remap_primaries syntax element indicating a BT.709 gamut, and a colour_remap_transfer_function syntax element indicating a HLG transfer function; and a second message MSG2 with a colour_remap_id syntax element indicating a peak brightness of 100 nits, a colour_remap_primaries syntax element indicating a BT.2020 gamut, and a colour_remap_transfer_function syntax element indicating a PQ transfer function. In this example, if the current display supports BT.2020/PQ, video decoding unit 29 may select MSG2. However, if the current display supports BT.709/HLG, video decoding unit 29 may select MSG1.

In some examples, video decoding unit 29

Video decoding unit 29 may colour remap, based on the selected colour remapping message, the samples of the current picture of video data (912). For instance, as described above with reference to FIG. 5, video postprocessor 31 may perform inverse quantization, inverse color conversion, and apply an inverse transfer function using information included in the selected colour remapping message (e.g., based on values of one or more of the following syntax elements included in the selected CRI SEI message: colour_remap_full_range_flag, colour_remap_primaries, colour_remap_transfer_function, and colour_remap_matrix_coefficients).

In some examples, video postprocessor 31 may apply the information of the colour remapping message at different points. For instance, video postprocessor 31 may apply the information of the colour remapping message either directly to decoded samples of video data or to the samples after some processing. In some examples, the colour remapping message may include a syntax element that indicate where the information of the colour remapping message is to be applied. For instance, the semantics of the colour_remap_id syntax element can be changed so that this syntax element also conveys the information whether the message is applied either directly to the decoded samples or to samples after some processing (e.g., after conversion of the decoded samples to the RGB domain from the Y'CbCr domain). As one example, a video coding unit may signal the colour_remap_id element with a first value (e.g., 0 or even) to indicate that the information of the colour remapping message is to be applied to the decoded samples of video data in the Y'CbCr domain. As another example, a video coding unit may signal the colour_remap_id element with a second value (e.g., 1 or odd) to indicate that the information of the colour remapping message is to be applied to the decoded samples of video data after conversion into the RGB domain.

As discussed above, in some examples, the colour_remap_id syntax element of a CRI SEI message may indicate a peak brightness of a target display to which the CRI SEI message corresponds. As also discussed above, in some examples, the same colour_remap_id syntax element may indicate whether the information of the CRI SEI is applied either directly to decoded samples of video data or to the samples after some processing. As such, in some examples, the colour_remap_id syntax element in a CRI SEI message may indicate both the peak brightness of a target display corresponding to the CRI SEI message and whether the video decoder is to apply the information of the selected CRI SEI message directly to decoded samples of video data or to the samples after some processing.

Video decoding unit 29 may output, for display at the current display, the colour remapped samples of the current picture of video data (914). For instance, video decoding unit 29 may cause display device 32 to display the colour remapped samples of the current picture of video data.

In some examples, if video decoding unit 29 decodes, for a current IRAP in a bitstream, a set of colour remapping messages that includes one or more colour remapping messages that each correspond to a respective peak brightness of a set of peak brightness values, the video decoding unit 29 will also be able to decode, for subsequent IRAPs in the bitstream, a respective set of colour remapping messages that includes one or more color remapping messages that each correspond to a respective peak brightness value of the same set of peak brightness values. For example, if video decoding unit 29 decodes a first CRI SEI message that corresponds to a first peak brightness (e.g., 300 nits) and a second CRI SEI message that corresponds to a second peak brightness (e.g., 700 nits) for a current IRAP in a bitstream, video decoding unit 29 will also decode a respective first CRI SEI message that corresponds to a first peak brightness (e.g., 300 nits) and a respective second CRI SEI message that corresponds to a second peak brightness (e.g., 700 nits) for all subsequent IRAPs in the bitstream. In this way, video decoding unit 29 may rely on the metadata for display adaptation for the bitstream.

In some examples, each of the CRI SEI messages may further include one or more syntax elements that specify the bit depth of the input video data (i.e., colour_remap_input_bit_depth) and/or the bit depth of the output video data (i.e., colour_remap_bit_depth). In some examples, the syntax element that specifies the bit depth of the input video data and syntax element that specifies that the bit depth of the output video data may always both be set to a particular value, such as "8," "10,", or "12." In this way, the complexity (e.g., memory and processing requirements) of the colour remapping process may be constrained.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing decoded video data, the method comprising:
    determining, by a video decoding unit, a peak brightness value of a current display;
    obtaining, by the video decoding unit and for a picture of video data, one or more colour remapping information (CRI) supplemental enhancement information (SEI) messages that each correspond to a respective peak brightness value of a set of peak brightness values, wherein each respective CRI SEI message of the CRI SEI messages includes a respective colour_remap_id syntax element that indicates the respective peak brightness value;
    determining, for each respective CRI SEI message of the CRI SEI messages, the respective peak brightness value based on a value of the respective colour_remap_id syntax element included in the respective CRI SEI message;
    selecting, by the video decoding unit and based on the peak brightness value of the current display, a CRI SEI message of the one or more CRI SEI messages;
    colour remapping, by the video decoding unit and based on the selected CRI SEI message, samples of the picture of video data; and
    outputting, by the video decoding unit and for display at the current display, the colour remapped samples of the picture of video data.

2. The method of claim 1, further comprising:
    determining the peak brightness value corresponding to a particular CRI SEI message of the one or more CRI SEI messages according to the following formula:

$$Tml_N = 100 * \text{ceil}\left(\frac{colour\_remap\_id_N + 1}{2}\right)$$

wherein $Tml_N$ is the peak brightness value corresponding to the particular CRI SEI message, $colour\_remap\_id_N$ is the colour_remap_id syntax element included in the particular CRI SEI message, and ceil is an upward rounding function.

3. The method of claim 1, wherein the respective peak brightness values have respective values that are between 100 nits of maximum luminance and 10000 nits of maximum luminance.

4. The method of claim 1, wherein the picture of video data comprises a current intra random access point (IRAP) picture of video data in a coded video bitstream, the method further comprising:
obtaining, by the video decoding unit and for each subsequent IRAP picture of video data in the coded video bitstream, a respective set of CRI SEI messages that includes one or more CRI SEI messages that each correspond to a respective peak brightness value of the same set of peak brightness values.

5. The method of claim 4, wherein each respective CRI SEI message of the CRI SEI messages further includes:
a respective colour_remap_input_bit_depth syntax element with a value of 10.

6. The method of claim 1, further comprising:
determining, based on the selected CRI SEI message, whether information of the message is to be applied to decoded samples of the picture of video data or to the decoded samples after processing of the decoded samples.

7. The method of claim 6, further comprising:
determining, based on the respective colour_remap_id syntax element of the selected CRI SEI message, whether information of the selected CRI SEI message is to be applied to decoded samples of the picture of video data in the Y'CbCr domain or to the decoded samples after conversion of the decoded samples into the RGB domain.

8. The method of claim 1, wherein selecting the colour remapping message comprises:
selecting, by the video decoding unit and based on the peak brightness value of the current display and one or both of a colour gamut of the current display and transfer functions supported by the current display, the CRI SEI message.

9. A method of encoding video data, the method comprising:
encoding, by a video encoder and in a bitstream, sample values for a picture of video data;
encoding, by the video encoder and in the bitstream, one or more colour remapping information (CRI) supplemental enhancement information (SEI) messages for the picture of video data, each of the colour remapping messages corresponding to a respective peak brightness value of a set of peak brightness values and including a respective colour_remap_id syntax element that indicates the peak brightness value to which the respective CRI SEI message corresponds; and
outputting, by the video encoder, the bitstream.

10. The method of claim 9, wherein encoding a colour_remap_id syntax element of a particular CRI SEI message of the one or more CRI SEI messages comprises encoding a value of the particular colour_remap_id syntax element according to the following relation:

$$Tml_N = 100 * \text{ceil}\left(\frac{colour\_remap\_id_N + 1}{2}\right)$$

wherein $Tml_N$ is the peak brightness value corresponding to the particular CRI SEI message, $colour\_remap\_id_N$ is the colour_remap_id syntax element included in the particular CRI SEI message, and ceil is an upward rounding function.

11. The method of claim 9, wherein the respective peak brightness values have respective values that are between 100 nits of maximum luminance and 10000 nits of maximum luminance.

12. The method of claim 9, wherein the picture of video data comprises a current intra random access point (IRAP) picture of video data, the method further comprising:
encoding, by the video encoder and for each subsequent IRAP picture of video data, a respective set of CRI SEI messages that includes one or more CRI SEI messages that each correspond to a respective peak brightness value of the same set of peak brightness values.

13. The method of claim 12, wherein each respective CRI SEI message of the CRI SEI messages further includes:
a respective colour_remap_input_bit_depth syntax element with a value of 10.

14. The method of claim 9, further comprising:
encoding, in each respective message of the one or more CRI SEI messages, an indication of whether a video decoding unit is to apply information of the respective message to decoded samples of the picture of video data or to the decoded samples after processing of the decoded samples.

15. The method of claim 14, wherein encoding the indication for a particular CEI SEI message comprises:
encoding the colour_remap_id syntax element for the particular CRI SEI message with a value that indicates both the peak brightness value corresponding to the respective CRI SEI message and whether the video decoding unit is to apply the information of the selected CRI SEI message to decoded samples of the picture of video data in the Y'CbCr domain or to the decoded samples after conversion of the decoded samples into the RGB domain.

16. A device for processing decoding video data, the device comprising:
a memory configured to store the video data; and
a video decoding unit configured to:
determine a peak brightness value of a current display;
obtain, for a picture of the video data, one or more colour remapping information (CRI) supplemental enhancement information (SEI) messages that each correspond to a respective peak brightness value of a set of peak brightness values, wherein each respective CRI SEI message of the CRI SEI messages includes a respective colour_remap_id syntax element that indicates the respective peak brightness value;
determine, for each respective CRI SEI message of the CRI SEI messages, the respective peak brightness value based on a value of the respective colour_remap_id syntax element included in the respective CRI SEI message;
select, based on the peak brightness value of the current display, a CRI SEI message of the one or more CRI SEI messages;
colour remap, based on the selected colour remapping message, samples of the picture of video data; and
output, for display at the current display, the colour remapped samples of the picture of video data.

17. The device of claim 16, wherein the respective peak brightness values have respective values that are between 100 nits of maximum luminance and 10000 nits of maximum luminance.

18. The device of claim 16, wherein the picture of video data comprises a current intra random access point (IRAP) picture of video data in a coded video bitstream, the video decoding unit further configured to:
obtain, for each subsequent IRAP picture of video data in the coded video bitstream, a respective set of CRI SEI messages that includes one or more CRI SEI messages that each correspond to a respective peak brightness value of the same set of peak brightness values.

19. The device of claim 18, wherein each respective CRI SEI message of the CRI SEI messages further includes:
   a respective colour_remap_input_bit_depth syntax element with a value of 10.

20. The device of claim 16, wherein the device comprises at least one of:
   an integrated circuit;
   a microprocessor; or
   a wireless communication device that includes the video decoding unit.

21. A device for encoding video data, the device comprising:
   a memory configured to store video data; and
   a video encoding unit configured to:
      encode, in a bitstream, sample values for a picture of video data;
      encode, in the bitstream, one or more colour remapping information (CRI) supplemental enhancement information (SEI) messages for the picture of video data, each of the CRI SEI messages corresponding to a respective peak brightness value of a set of peak brightness values and including a respective colour_remap_id syntax element that indicates the peak brightness value to which the respective CRI SEI message corresponds; and
      output the bitstream.

22. The device of claim 21, wherein the respective peak brightness values have respective values that are between 100 nits of maximum luminance and 10000 nits of maximum luminance.

23. The device of claim 21, wherein the picture of video data comprises a current intra random access point (TRAP) picture of video data, the video encoding unit further configured to:
   encode, for each subsequent TRAP picture of video data, a respective set of CRI SEI messages that includes one or more CRI SEI messages that each correspond to a respective peak brightness value of the same set of peak brightness values.

24. The device of claim 23, wherein, to encode each respective CRI SEI message of the CRI SEI messages, the video encoding unit is further configured to encode:
   a respective colour_remap_input_bit_depth syntax element with a value of 10.

25. The device of claim 21, wherein the device comprises at least one of:
   an integrated circuit;
   a microprocessor; or
   a wireless communication device that includes the video encoding unit.

* * * * *